P. G. ZIMMERMANN.
AEROPLANE FITTING.
APPLICATION FILED MAY 14, 1917.
1,290,004.
Patented Dec. 31, 1918.
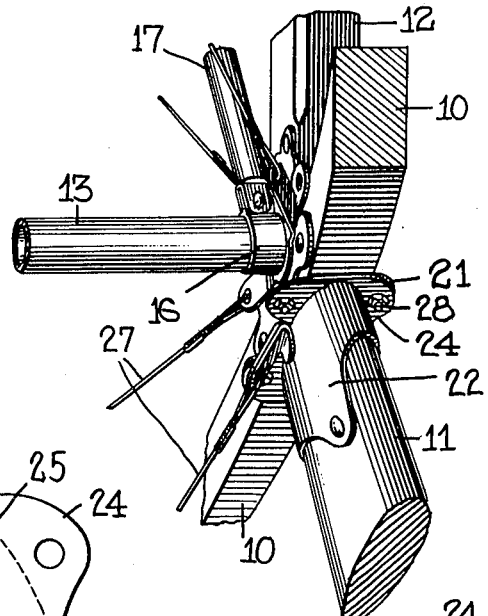
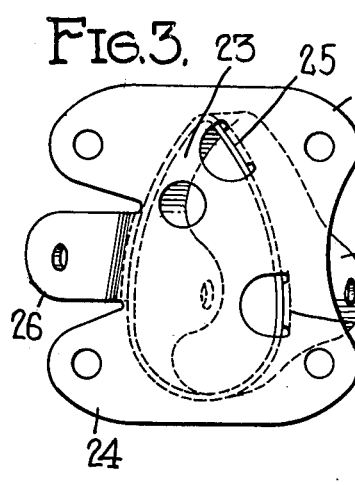
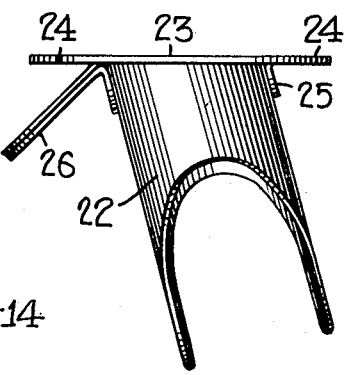
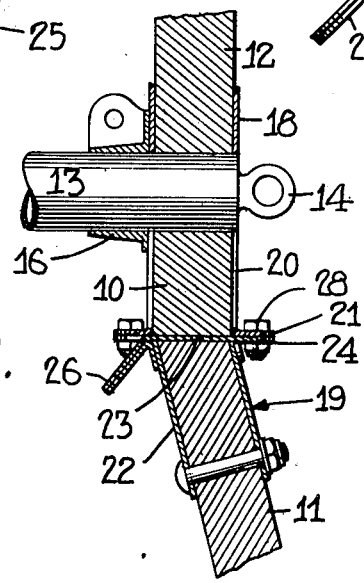
Inventor
PAUL G. ZIMMERMANN
By
Attorney

UNITED STATES PATENT OFFICE.

PAUL G. ZIMMERMANN, OF BUFFALO, NEW YORK, ASSIGNOR TO CURTISS AEROPLANE AND MOTOR CORPORATION, A CORPORATION OF NEW YORK.

AEROPLANE-FITTING.

1,290,004.  Specification of Letters Patent.  Patented Dec. 31, 1918.

Application filed May 14, 1917.  Serial No. 168,588.

*To all whom it may concern:*

Be it known that I, PAUL G. ZIMMERMANN, a citizen of the United States, residing at Buffalo, in the county of Erie and State of New York, have invented certain new and useful Improvements in Aeroplane-Fittings, of which the following is a specification.

My invention relates to aeroplane fittings. It is characterized by a two-part construction in which the two fitting parts are united and engage respectively with the fuselage and landing gear of the craft. One of the two fitting parts is constructed in clip form and the other in the form of a clip or socket. The clip portion of the fitting is appropriately fashioned to function conjointly as a fuselage clip and the socket portion conjointly as a landing gear clip and strut socket. The landing gear struts are in this way removably fastened to the fuselage and the landing gear in its entirety made removable as a unit.

A further characteristic of the invention is the construction of the clip and socket in such manner that the corresponding flanges abut and extend out laterally from the fitting parts to accommodate the fastening means. There is thus evolved an extremely simple fitting connection in which the fastening means is accessible and easily removable and in which the fitting parts are independent and separately fastened to the fuselage and landing gear respectively. Being thus separately fastened the fuselage and landing gear are unaffected individually by separation of the fitting parts. Moreover, the lateral formation of the abutting flanges is such that the landing strains are borne by the connected and alined fuselage and landing gear struts.

Of the drawings:

Figure 1 is a perspective view of the two-part fitting illustrating its use as a connection between one of the landing gear struts of an aeroplane and the fuselage or body thereof;

Fig. 2 is a transverse vertical sectional view;

Fig. 3 is a top plan view of the strut clip or socket, and

Fig. 4 is an edge view.

Before proceeding with a description of the drawings it is to be understood that the particular location of one of the fitting parts with respect to the fuselage or body of the craft is immaterial although its location at the foot of one of the fuselage struts is considered best by reason of the increased strength of the landing gear connection thus obtained. Furthermore, the particular form or type of fuselage clip is immaterial.

In the embodiment of the invention selected for illustration, 10 designates one of the lower longerons of the fuselage of an aeroplane, 11 one of the landing gear struts, 12 one of the vertically extending fuselage struts, 13 one of the metal tie tubes characteristic of a Curtiss machine, and 14 a portion of one of the hinge connections formed upon the extremities of the tie tube for complemental engagement with that portion of the hinge connection carried by one of the wing beams of the aeroplane wings (not shown). As shown, the tie tube 13 is let through the vertically extending fuselage strut 12 and equipped with collars 16 (but one of which is shown) arranged to abut the inner adjacent faces of said struts. Moreover, the tie tube 13 serves as an anchorage for upwardly converging engine bed braces (but one of which is shown) 17.

The fitting of the invention, as intimated, is constructed in two-part form, one part, designated in its entirety by the numeral 18 being constructed in clip form and the other part, designed in its entirety by the numeral 19, in socket form. The clip part 18 comprises opposed lightened sections 20 engageable respectively with the opposite vertical faces of the longeron 10, the length of the opposed plates or sections being such that they overlap or extend beyond said longeron to receive between them the vertically extending fuselage strut 12. The opposed sections of the clip 18 are each laterally flanged or extended as at 21. These flanges may be integral or non-integral and of any appropriate thickness and size. Preferably, the bottom surfaces of the said flanges lie flush with the bottom surface of the longeron 10 (see Fig. 2).

That portion of the two-part fitting designated in its entirety by the numeral 19 comprises a socket member 22 and a plate member 23. In its preferred embodiment the plate 23 is constructed as shown in Fig. 3 and interposed between the flanges 21 of the clip 18 and the socket 22 of the socket portion 19. The size of the plate 23 is such that it extends laterally beyond the sides of the socket member 22 and, as indicated in Fig. 2, corresponds generally in form with the form given the flanges 21. Thus the portions of the plate 23 which extend laterally beyond the socket 22 to underlie and abut the flanges 21 will be hereinafter referred to as the socket flanges of the fitting. Said flanges are designated 24.

The plate 23 and the socket member 22 may be made either integral or non-integral and in the embodiment disclosed are shown as integrally united. Ears 25 are struck out from the plate 23 and down-turned (see Figs. 3 and 4) to receive between them the socket member. The ears 25 and the socket member 22 may be brazed, welded or in any other manner permanently or integrally united.

Both the clip 18 and the socket portion 19 of the two-part fitting are equipped with integrally formed ears 26 for the proper anchorage of diagonally extending stays 27 cross arranged to truss both the fuselage and the landing gears. The arrangement and location of these ears with respect to the connected parts of the fitting is immaterial.

In both instances the flanges 21 and 24 extend out laterally beyond the sides of the fitting to accommodate fastening devices 28 in the form of vertically extending bolts which penetrate both said flanges. By extending the bolts vertically all landing strains are borne almost entirely by the struts 11 and 12. The connection is such that the separate fitting parts may be removed and the landing gear in its entirety taken off and replaced. Moreover, the connection between the fitting parts is such that a separation of the parts will in no way alter the individual connections between said parts and the fuselage and landing gear struts respectively.

Although I have described more or less precise forms and details of construction, I do not intend to be understood as limiting myself thereto as I contemplate changes in form, the proportion of parts and the substitution of equivalents as circumstances may suggest or render expedient and without departing from the spirit of the invention as claimed.

What is claimed is:

1. An aeroplane fitting including a clip engageable with the fuselage of the craft, a socket fitting engageable with the landing gear of the craft at its point of connection with the fuselage, and means engaging both said clip and said socket for separably uniting the landing gear and the fuselage.

2. A two-part aeroplane fitting including a laterally flanged fuselage clip, a correspondingly flanged landing gear strut socket, and means engaging said flanges for separably uniting the landing gear and fuselage.

3. An aeroplane fitting including a flanged fuselage clip, a correspondingly flanged landing gear strut fitting, the clip flange and the strut fitting flange engaging, and fastening means penetrating said flanges for separably uniting the landing gear and the fuselage.

4. An aeroplane fitting including a laterally flanged fuselage clip, a correspondingly flanged landing gear strut socket, and means penetrating said flanges for separably uniting said landing gear and fuselage.

5. In an aeroplane, the combination with the fuselage and the landing gear, of a two-part fitting having its separate parts fastened respectively to the fuselage and landing gear, abutting flanges formed respectively upon the separate fitting parts, and means for separably uniting the flanges of said fitting parts.

6. An aeroplane fitting including a flanged fuselage clip, a separate landing gear strut fitting, a plate member interposed between said plate and said strut fitting for abutting engagement with said clip, the marginal edges of said plate member being extended beyond the sides of said socket, means integrally uniting said plate and said socket, and means penetrating said flange and said plate for releasably fastening the landing gear to the fuselage.

7. An aeroplane fitting including separable fitting parts attached respectively to the fuselage and landing gear, the respective fitting parts being provided each with a flattened bearing surface, the bearing surfaces being in engagement one with the other, and means for fastening the fitting parts together, the arrangement of the fastening means being such that all shearing tendency due to landing and ground operation is avoided.

In testimony whereof I hereunto affix my signature.

PAUL G. ZIMMERMANN.

Copies of this patent may be obtained for five cents each, by addressing the "Commissioner of Patents, Washington, D. C."